United States Patent
Gunderson et al.

(10) Patent No.: US 9,836,716 B2
(45) Date of Patent: Dec. 5, 2017

(54) SYSTEM AND METHOD FOR REDUCING DRIVING RISK WITH HINDSIGHT

(75) Inventors: Charlie Gunderson, La Jolla, CA (US); Tom Lafleur, Rancho Santa Fe, CA (US); Doron Lurie, San Diego, CA (US); Bruce Moeller, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 973 days.

(21) Appl. No.: 11/382,325

(22) Filed: May 9, 2006

(65) Prior Publication Data

US 2007/0271105 A1   Nov. 22, 2007

(51) Int. Cl.
*G06Q 10/00* (2012.01)
*G06Q 10/08* (2012.01)
*G07C 5/08* (2006.01)

(52) U.S. Cl.
CPC ......... *G06Q 10/087* (2013.01); *G07C 5/0858* (2013.01); *G07C 5/0891* (2013.01)

(58) Field of Classification Search
USPC .............................................................. 705/1
See application file for complete search history.

(56) References Cited

U.S. PATENT DOCUMENTS

| | | |
|---|---|---|
| 2,943,141 A | 6/1960 | Knight |
| 3,634,866 A | 1/1972 | Meyer |
| 3,781,824 A | 12/1973 | Caiati et al. |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis, Jr. et al. |

(Continued)

FOREIGN PATENT DOCUMENTS

| | | |
|---|---|---|
| EP | 1355278 | 10/2003 |
| EP | 1355278 A1 | 10/2003 |

(Continued)

OTHER PUBLICATIONS

Drivecam.com as retrieved by the Internet Archive Wayback Machine as of Mar. 5, 2005.*

(Continued)

*Primary Examiner* — Paul R Fisher
(74) *Attorney, Agent, or Firm* — Van Pelt, Yi & James LLP

(57) ABSTRACT

A system and method for computer assisted event based reconstruction and forensic analysis of vehicle accidents is provided. The system comprises an event capture device that records audio, video, and other information that collectively comprise one or more events related to a vehicle accident. The event data, including the audio, video, and other related information, is provided to an evaluation server where it is stored in a database for forensic analysis of the events comprising the vehicle accident. Event data for a specific automobile accident event is analyzed and compared to similar types of automobile accident event data in order to forensically analyze the specific event and correlate causal relationships with key elements of the event data to determine the likely cause of the accident or the factors contributing to the accident. Correlation information is also stored at the evaluation server to provide historical data points about causal relationships and key elements.

12 Claims, 6 Drawing Sheets

(56) References Cited

U.S. PATENT DOCUMENTS

| | | |
|---|---|---|
| 4,271,358 A | 6/1981 | Schwarz |
| 4,280,151 A | 7/1981 | Tsunekawa et al. |
| 4,281,354 A | 7/1981 | Conte |
| 4,401,976 A | 8/1983 | Stadelmayr |
| 4,409,670 A | 10/1983 | Herndon et al. |
| 4,420,773 A | 12/1983 | Toyoda et al. |
| 4,425,097 A | 1/1984 | Owens |
| 4,456,931 A | 6/1984 | Toyoda et al. |
| 4,489,351 A | 12/1984 | d'Alayer de Costemore d'Arc |
| 4,496,995 A | 1/1985 | Colles et al. |
| 4,500,868 A | 2/1985 | Tokitsu et al. |
| 4,533,962 A | 8/1985 | Decker et al. |
| 4,558,379 A | 12/1985 | Hutter et al. |
| 4,593,313 A | 6/1986 | Nagasaki et al. |
| 4,621,335 A | 11/1986 | Bluish et al. |
| 4,625,210 A | 11/1986 | Sagl |
| 4,630,110 A | 12/1986 | Cotton et al. |
| 4,632,348 A | 12/1986 | Keesling et al. |
| 4,638,289 A | 1/1987 | Zottnik |
| 4,646,241 A | 2/1987 | Ratchford et al. |
| 4,651,143 A | 3/1987 | Yamanaka |
| 4,758,888 A | 7/1988 | Lapidot |
| 4,763,745 A | 8/1988 | Eto et al. |
| 4,785,474 A | 11/1988 | Bernstein et al. |
| 4,789,904 A | 12/1988 | Peterson |
| 4,794,566 A | 12/1988 | Richards et al. |
| 4,804,937 A | 2/1989 | Barbiaux et al. |
| 4,806,931 A | 2/1989 | Nelson |
| 4,814,896 A | 3/1989 | Heitzman et al. |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,876,597 A | 10/1989 | Roy et al. |
| 4,883,349 A | 11/1989 | Mittelhauser |
| 4,896,855 A | 1/1990 | Furnish |
| 4,930,742 A | 6/1990 | Schofield et al. |
| 4,936,533 A | 6/1990 | Adams et al. |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente et al. |
| 4,992,943 A | 2/1991 | McCracken |
| 5,012,335 A | 4/1991 | Cohodar |
| 5,027,104 A | 6/1991 | Reid |
| 5,056,056 A | 10/1991 | Gustin |
| 5,057,820 A | 10/1991 | Markson et al. |
| 5,096,287 A | 3/1992 | Kakinami et al. |
| 5,100,095 A | 3/1992 | Haan et al. |
| 5,111,289 A | 5/1992 | Lucas et al. |
| 5,140,434 A | 8/1992 | Van Blessinger et al. |
| 5,140,436 A | 8/1992 | Blessinger |
| 5,144,661 A | 9/1992 | Shamosh et al. |
| 5,178,448 A | 1/1993 | Adams et al. |
| 5,196,938 A | 3/1993 | Blessinger |
| 5,223,844 A | 6/1993 | Mansell et al. |
| 5,262,813 A | 11/1993 | Scharton |
| 5,294,978 A * | 3/1994 | Katayama ................ 375/240.12 |
| 5,308,247 A | 5/1994 | Dyrdek |
| 5,309,485 A * | 5/1994 | Chao ........................... 376/215 |
| 5,311,197 A | 5/1994 | Sorden et al. |
| 5,321,753 A | 6/1994 | Gritton |
| 5,327,288 A | 7/1994 | Wellington et al. |
| 5,330,149 A | 7/1994 | Haan et al. |
| 5,343,527 A | 8/1994 | Moore |
| 5,353,023 A | 10/1994 | Mitsugi |
| 5,361,326 A | 11/1994 | Aparicio, IV et al. |
| 5,387,926 A | 2/1995 | Bellan |
| 5,388,045 A | 2/1995 | Kamiya et al. |
| 5,404,330 A | 4/1995 | Lee et al. |
| 5,408,330 A | 4/1995 | Squicciarini et al. |
| 5,422,543 A | 6/1995 | Weinberg |
| 5,430,431 A | 7/1995 | Nelson |
| 5,430,432 A | 7/1995 | Camhi et al. |
| 5,435,184 A | 7/1995 | Pineroli et al. |
| 5,445,024 A | 8/1995 | Riley, Jr. et al. |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman et al. |
| 5,465,079 A | 11/1995 | Bouchard et al. |
| 5,473,729 A | 12/1995 | Bryant et al. |
| 5,477,141 A | 12/1995 | Nather et al. |
| 5,495,242 A | 2/1996 | Kick et al. |
| 5,497,419 A | 3/1996 | Hill |
| 5,499,182 A | 3/1996 | Ousborne |
| 5,504,482 A | 4/1996 | Schreder |
| 5,515,285 A | 5/1996 | Garrett, Sr. et al. |
| 5,521,633 A | 5/1996 | Nakajima et al. |
| 5,523,811 A | 6/1996 | Wada et al. |
| 5,526,269 A | 6/1996 | Ishibashi et al. |
| 5,530,420 A | 6/1996 | Tsuchiya et al. |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii et al. |
| 5,546,191 A | 8/1996 | Hibi et al. |
| 5,546,305 A | 8/1996 | Kondo |
| 5,548,273 A | 8/1996 | Nicol et al. |
| 5,552,990 A | 9/1996 | Ihara et al. |
| 5,559,496 A | 9/1996 | Dubats |
| 5,568,211 A | 10/1996 | Bamford |
| 5,570,127 A | 10/1996 | Schmidt |
| 5,574,443 A | 11/1996 | Hsieh |
| D376,571 S | 12/1996 | Kokat |
| 5,581,464 A | 12/1996 | Woll et al. |
| 5,590,948 A | 1/1997 | Moreno |
| 5,596,382 A | 1/1997 | Bamford |
| 5,600,775 A | 2/1997 | King et al. |
| 5,610,580 A | 3/1997 | Lai |
| 5,612,686 A | 3/1997 | Takano et al. |
| 5,631,638 A | 5/1997 | Kaspar et al. |
| 5,638,273 A | 6/1997 | Coiner et al. |
| 5,642,106 A | 6/1997 | Hancock et al. |
| 5,646,856 A | 7/1997 | Kaesser |
| 5,652,706 A | 7/1997 | Morimoto et al. |
| RE35,590 E | 8/1997 | Bezos et al. |
| 5,654,892 A | 8/1997 | Fujii et al. |
| 5,659,355 A | 8/1997 | Barron et al. |
| 5,667,176 A | 9/1997 | Zamarripa et al. |
| 5,669,698 A | 9/1997 | Veldman et al. |
| 5,671,451 A | 9/1997 | Takahashi et al. |
| 5,677,979 A | 10/1997 | Squicciarini et al. |
| 5,680,117 A | 10/1997 | Arai et al. |
| 5,680,123 A | 10/1997 | Lee |
| 5,689,442 A | 11/1997 | Swanson et al. |
| 5,696,705 A | 12/1997 | Zykan |
| 5,706,362 A | 1/1998 | Yabe |
| 5,712,679 A | 1/1998 | Coles |
| 5,717,456 A | 2/1998 | Rudt et al. |
| 5,719,554 A | 2/1998 | Gagnon |
| 5,784,007 A * | 7/1998 | Pepper .......................... 340/933 |
| 5,784,521 A | 7/1998 | Nakatani et al. |
| 5,790,403 A | 8/1998 | Nakayama |
| 5,790,973 A | 8/1998 | Blaker et al. |
| 5,793,420 A | 8/1998 | Schmidt |
| 5,794,165 A | 8/1998 | Minowa et al. |
| 5,797,134 A | 8/1998 | McMilllan et al. |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank et al. |
| 5,815,093 A | 9/1998 | Kikinis |
| 5,825,412 A | 10/1998 | Hobson et al. |
| 5,844,505 A | 12/1998 | Van Ryzin |
| 5,896,167 A | 4/1999 | Omae et al. |
| 5,897,606 A | 4/1999 | Miura et al. |
| 5,899,956 A | 5/1999 | Chan |
| 5,901,806 A | 5/1999 | Takahashi |
| 5,914,748 A | 6/1999 | Parulski et al. |
| 5,926,210 A | 7/1999 | Hacket et al. |
| 5,946,404 A | 8/1999 | Bakshi et al. |

(56) References Cited

U.S. PATENT DOCUMENTS

| | | |
|---|---|---|
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa et al. |
| 6,011,492 A | 1/2000 | Garesche |
| 6,028,528 A | 2/2000 | Lorenzetti et al. |
| 6,037,860 A | 3/2000 | Zander et al. |
| 6,037,977 A | 3/2000 | Peterson |
| 6,064,792 A | 5/2000 | Fox et al. |
| 6,092,193 A | 7/2000 | Loomis et al. |
| 6,122,738 A | 9/2000 | Millard |
| 6,141,611 A | 10/2000 | Mackey et al. |
| 6,144,296 A | 11/2000 | Ishida et al. |
| 6,151,065 A | 11/2000 | Steed et al. |
| 6,163,338 A | 12/2000 | Johnson et al. |
| 6,167,186 A | 12/2000 | Kawasaki et al. |
| 6,181,373 B1 | 1/2001 | Coles |
| 6,185,490 B1 | 2/2001 | Ferguson |
| 6,200,139 B1 | 3/2001 | Clapper |
| 6,211,907 B1 | 4/2001 | SEaman et al. |
| 6,218,960 B1 | 4/2001 | Ishikawa et al. |
| 6,246,933 B1 | 6/2001 | Bague |
| 6,252,544 B1 | 6/2001 | Hoffberg |
| 6,253,129 B1 | 6/2001 | Jenkins et al. |
| 6,337,622 B1 | 1/2002 | Sugano |
| 6,389,340 B1 | 5/2002 | Rayner |
| 6,405,112 B1 | 6/2002 | Rayner |
| 6,405,132 B1* | 6/2002 | Breed et al. ............... 701/301 |
| 6,408,232 B1 | 6/2002 | Cannon et al. |
| 6,449,540 B1 | 9/2002 | Rayner |
| 6,559,769 B2 | 5/2003 | Anthony et al. |
| 6,611,755 B1 | 8/2003 | Coffee et al. |
| 6,679,702 B1 | 1/2004 | Rau |
| 6,714,894 B1 | 3/2004 | Tobey et al. |
| 6,718,239 B2 | 4/2004 | Rayner |
| 6,873,261 B2 | 3/2005 | Anthony et al. |
| 6,895,248 B1 | 5/2005 | Akyol et al. |
| 6,950,122 B1 | 9/2005 | Mirabile |
| 7,012,632 B2 | 3/2006 | Freeman et al. |
| 7,023,333 B2 | 4/2006 | Blanco et al. |
| 7,100,190 B2 | 8/2006 | Johnson et al. |
| 7,119,832 B2 | 10/2006 | Blanco et al. |
| 7,386,376 B2 | 6/2008 | Basir et al. |
| 7,804,426 B2 | 9/2010 | Etcheson |
| 2001/0005804 A1 | 6/2001 | Rayner |
| 2002/0035422 A1 | 3/2002 | Sasaki |
| 2002/0059453 A1 | 5/2002 | Eriksson et al. |
| 2002/0111725 A1 | 8/2002 | Burge |
| 2002/0135679 A1 | 9/2002 | Scaman |
| 2002/0163532 A1 | 11/2002 | Thomas et al. |
| 2002/0169529 A1 | 11/2002 | Kim |
| 2003/0080878 A1 | 5/2003 | Kirmuss |
| 2003/0081122 A1 | 5/2003 | Kirmuss |
| 2003/0125854 A1 | 7/2003 | Kawasaki et al. |
| 2003/0144775 A1 | 7/2003 | Klausner |
| 2003/0154009 A1 | 8/2003 | Basir et al. |
| 2003/0158638 A1 | 8/2003 | Yakes et al. |
| 2003/0187704 A1 | 10/2003 | Hashiguchi et al. |
| 2003/0191568 A1 | 10/2003 | Breed |
| 2003/0214585 A1 | 11/2003 | Bakewell |
| 2004/0039503 A1 | 2/2004 | Doyle |
| 2004/0103008 A1 | 5/2004 | Wahlbin et al. |
| 2004/0103010 A1* | 5/2004 | Wahlbin et al. ............... 705/4 |
| 2004/0145457 A1 | 7/2004 | Schofield et al. |
| 2004/0153244 A1 | 8/2004 | Kellum |
| 2004/0209594 A1 | 10/2004 | Naboulsi |
| 2005/0021199 A1 | 1/2005 | Zimmerman et al. |
| 2005/0034057 A1* | 2/2005 | Hull ............... G06F 17/212 |
| | | 715/202 |
| 2005/0060071 A1 | 3/2005 | Winner |
| 2005/0088291 A1 | 4/2005 | Blanco et al. |
| 2005/0159964 A1 | 7/2005 | Sonnenrein et al. |
| 2005/0166258 A1 | 7/2005 | Vasilevsky et al. |
| 2005/0171692 A1 | 8/2005 | Hamblen et al. |
| 2005/0185936 A9 | 8/2005 | Lao et al. |
| 2005/0258942 A1 | 11/2005 | Manasseh et al. |
| 2006/0007151 A1 | 1/2006 | Ram |
| 2006/0015233 A1 | 1/2006 | Olsen et al. |
| 2006/0025897 A1 | 2/2006 | Shostak et al. |
| 2006/0040239 A1 | 2/2006 | Cummins et al. |
| 2006/0053038 A1 | 3/2006 | Warren et al. |
| 2006/0055521 A1 | 3/2006 | Blanco et al. |
| 2006/0057543 A1 | 3/2006 | Roald |
| 2006/0078853 A1 | 4/2006 | Lanktree |
| 2006/0092043 A1 | 5/2006 | Lagassey |
| 2006/0095175 A1 | 5/2006 | Dewaal et al. |
| 2006/0095199 A1 | 5/2006 | Lagassey |
| 2006/0095349 A1 | 5/2006 | Morgan et al. |
| 2006/0161960 A1 | 7/2006 | Benoit |
| 2006/0192658 A1 | 8/2006 | Yamamura |
| 2006/0212195 A1 | 9/2006 | Veith et al. |
| 2006/0242680 A1 | 10/2006 | Johnson et al. |
| 2007/0001831 A1 | 1/2007 | Raz et al. |
| 2007/0035632 A1 | 2/2007 | Silvernail |
| 2007/0124332 A1 | 5/2007 | Ballesty et al. |
| 2007/0127833 A1* | 6/2007 | Singh ............... 382/254 |
| 2007/0135979 A1 | 6/2007 | Plante |
| 2007/0136078 A1 | 6/2007 | Plante |
| 2007/0143499 A1 | 6/2007 | Chang |
| 2007/0150140 A1 | 6/2007 | Seymour |
| 2007/0241874 A1 | 10/2007 | Okpysh et al. |
| 2007/0257782 A1 | 11/2007 | Etcheson |
| 2007/0260677 A1 | 11/2007 | DeMarco et al. |
| 2007/0273480 A1 | 11/2007 | Burkman et al. |
| 2007/0279214 A1 | 12/2007 | Buehler |
| 2008/0169914 A1 | 7/2008 | Albertson et al. |
| 2008/0177436 A1 | 7/2008 | Fortson |
| 2008/0252485 A1 | 10/2008 | Lagassey |

FOREIGN PATENT DOCUMENTS

| | | | |
|---|---|---|---|
| GB | 2 268 608 | 1/1994 | |
| JP | 5-137144 | 6/1993 | |
| JP | 5-294188 | 11/1993 | |
| JP | 8-124069 | 5/1996 | |
| JP | 10-076880 | 3/1998 | |
| WO | WO 88/09023 | 11/1988 | |
| WO | WO 90/05076 | 5/1990 | |
| WO | WO 94/27844 | 12/1994 | |
| WO | WO 96/00957 | 1/1996 | |
| WO | WO 97/01246 | 1/1997 | |
| WO | WO 99/37503 | 7/1999 | |
| WO | WO 99/40545 | 8/1999 | |
| WO | WO 99/62741 | 12/1999 | |
| WO | WO0007150 | * 2/2000 | ............... G07C 5/00 |
| WO | WO 00/48033 | 8/2000 | |
| WO | WO 00/77620 | 12/2000 | |
| WO | WO 01/25054 | 4/2001 | |

OTHER PUBLICATIONS

International Search Report and Written Opinion issued in PCT/US07/68332 dated Mar. 3, 2008.
Jean (DriveCam vendor), "Feedback Data Sheet", Nov. 6, 2002.
International Search Report and Written Opinion issued in PCT/US07/68325 dated Feb. 27, 2008.
International Search Report and Written Opinion issued in PCT/US07/68333 dated Mar. 5, 2008.
International Search Report and Written Opinion issued in PCT/US07/68334 dated Mar. 5, 2008.
Hans Fantel, Video; Search Methods Make a Difference in Picking VCR's, NY Times, Aug. 13, 1989.
International Search Report and Written Opinion issued in PCT/US07/68329 dated Mar. 3, 2008.
International Search Report issued in PCT/US07/68328 dated Oct. 15, 2007.
Written Opinion issued in PCT/US07/68328 dated Oct. 15, 2007.
"World News Tonight", CBS Television New Program discussing teen drivers using the DriveCam Program and DriveCam Technol-

(56) References Cited

OTHER PUBLICATIONS ogy, Oct. 10, 2005, on PC formatted CD-R, World News Tonight. wmv, 7.02 MB, Created Jan. 12, 2011.
"World News Tonight", PBS Television New Program discussing teen drivers using the DriveCam Program and DriveCam Technology, Oct. 10, 2005, on PC formatted CD-R, Teens Behind the Wheel.wmv, 236 MB, Created Jan. 12, 2011.
Drivecam, Inc., User's Manual for DRIVECAM Video Systems' Hindsight 20/20 Software Version 4.0 (2003).
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
Panasonic Corporation, Video Cassette Recorder (VCR) Operating Instructions for Models No. PV-V4020/PV-V4520 (1998) (Exhibit 8) (hereinafter "Panasonic").
"Ambulance Companies Use Video Technology to Improve Driving Behavior", Ambulance Industry Journal, Spring 2003.
Lisa McKenna, "A Fly on the Windshield?", Pest Control Technology Magazine, Apr. 2003.
Quinn Maughan, "Enterprise Services", Apr. 17, 2006.
Quinn Maughan, "DriveCam Enterprise Services", Jan. 5, 2006.
Quinn Maughan, "DriveCam Managed Services", Jan. 5, 2006.
Quinn Maughan, "DriveCam Standard Edition", Jan. 5, 2006.
Kathy Latus (Latus Design), "Case Study—Time Warner Cable", Sep. 23, 2005.
Kathy Latus (Latus Design), "Case Study—Cloud 9 Shuttle", Sep. 23, 2005.
Kathy Latus (Latus Design), "Case Study—Lloyd Pest Control", Jul. 19, 2005.
Bill Siuru, "DriveCam Could Save You Big Bucks", Land Line Magazine, May-Jun. 2000.
J. Gallagher, "Lancer Recommends Tech Tool", Insurance and Technology Magazine, Feb. 2002.
DriveCam, Inc.'s Infringement Contentions Exhibit A, U.S. Pat. No. 6,389,340. Aug. 11, 2011.
DriveCam, Inc.'s Infringement Contentions Exhibit B, U.S. Pat. No. 7,659,827. Aug. 19, 2011.
DriveCam, Inc.'s Infringement Contentions Exhibit C, U.S. Pat. No. 7,804,426. Aug. 19, 2011.
U.S. Appl. No. 11/297,669, filed Dec. 8, 2005, File History.
"Amended Complaint for Patent Infringement, Trade Secret Misappropriation, Unfair Competition and Conversion" in *DriveCam, Inc. v. SmartDrive Systems, Inc.*, Case No. 3:11-CV-00997-H-RBB, for the Southern District of California, Document 34, filed Oct. 20, 2011, pp. 1-15.
U.S. Appl. No. 11/296,906, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
JVC Company of America, JVC Video Cassette Recorder HR-IP820U Instruction (1996).
Hans Fantel, Video, Search Methods Make a Difference in Picking VCR's, NY Times, Aug. 13, 1989.
Dan Carr, Flash Video template: Video Presentation with Navigation, Jan. 16, 2006.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Category_Code=coaching)., printed from site on Jan. 11, 2012.
GE published its VCR User's Guide for Model VG4255 in 1995.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11. 2012.
David Vogeleer et al., Macromedia Flash Professional 8UNLEASHED (Sams Oct. 12, 2005) in Nov. 2005.
Chris Woodyard, "Shuttles save with DriveCam", Dec. 9, 2003.
Julie Stevens, "DriveCam Services", Nov. 15, 2004.
Julie Stevens, "Program Support Roll-Out & Monitoring", Jul. 13, 2004.
Jessyca Wallace, "The DriveCam Driver Feedback Systems", Apr. 6, 2004.
Karen, "Managers Guide to the DriveCam Driving Feedback Systems", Jul. 30, 2002.
Jessyca Wallace, "Analyzing and Processing DriveCam Recorded Events", Oct. 6, 2003.
Jessyca Wallace, "Overview of the DriveCam Program", Dec. 15, 2005.
"DriveCam—Illuminator Data Sheet", Oct. 2, 2004.
Karen, "Downloading Options to HindSight 20/20", Aug. 6, 2002.
Bill, "DriveCam—FAQ", Dec. 12, 2003.
"Passenger Transportation Mode Brochure", May 2, 2005.
Quinn Maughan, "DriveCam Unit Installation", Jul. 21, 2005.
Glenn Oster, "Illuminator Installation", Oct. 2004.
Quinn Maughan, "HindSight Installation Guide", Sep. 29, 2005.
Quinn Maughan, "HindSight Users Guide", Jun. 20, 2005.
David Cullen, "Getting a real eyeful", Fleet Owner Magazine, Feb. 2002.
Ronnie Rittenberry, "Eyes on the Road", Jul. 2004.
Glenn Oster, "HindSight 20/20 v4.0 Software Installation", 1 of 2, Jun. 20, 2003.
Glenn Oster, "HindSight 20/20 v4.0 Software Installation", 2 of 2, Jun. 20, 2003.
"DriveCam, Inc's Disclosure of Proposed Constructions and Extrinsic Evidence Pursuant to Patent L.R. 4.1.a & 4.1.b" in *DriveCam, Inc. v. SmartDrive Systems, Inc.*, Case No. 3:11-CV-00997-H-RBB, for the Southern District of California. Nov. 8, 2011.
"Preliminary Claim Construction and Identification of Extrinsic Evidence of Defendant/Counterclaimant SmartDriveSystems, Inc." in *DriveCam, Inc. v. SmartDrive Systems, Inc.*, Case No. 3:11-CV-00997-H (RBB), for the Southern District of California. Nov. 8, 2011.
"DriveCam, Inc's Disclosure of Responsive Constructions and Extrinsic Evidence Pursuant to Patent L.R. 4.1.c & 4.1d" in *DriveCam, Inc. v. SmartdDrive Systems, Inc.* Case No. 3:11-CV-00997-H-Rbb, for the Southern District of California. Nov. 15, 2011.
"Responsive Claim Construction and Identification of Extrinsic Evidence of Defendant/Counterclaim SmartDrive Systems, Inc." in *DriveCam, Inc. v. SmartDrive Systems, Inc.*, Case No. 3:11-CV-00997-H (RBB), for the Southern District of California. Nov. 15, 2011.
"Joint Claim Construction Chart" in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Chart, U.S. Pat. No. 6,389,340, "Vehicle Data Recorder" for Case No. 3:11-CV-00997-H-RBB, Document 43-1, filed Dec. 1, 2011, pp. 1-33.
"Joint Claim Construction Worksheet" in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.
"Answer to Amended Complaint; Counterclaims; and Demand for Jury Trial" in *DriveCam, Inc. v. SmartDrive Systems, Inc.*, Case No. 3:11-CV-00997 H (RBB), for the Southern District of California, Document 47, filed Dec. 13, 2011, pp. 1-15.
"First Amended Answer to Amended Complaint and First Amended Counterclaims; and Demand for Jury Trial" in *DriveCam, Inc. v. SmartDrive Systems, Inc.*, Case No. 3:11-CV-00997 H (RBB), for the Southern District of California, Document 53, filed Dec. 20, 2011, pp. 1-48.

(56) References Cited

OTHER PUBLICATIONS

"First Amended Answer to Amended Complaint and First Amended Counterclaims; and Demand for Jury Trial" in *DriveCam, Inc. v. SmartDrive Systems, Inc.*, Case No. 3:11-CV-00997 H (RBB), for the Southern District of California, Document 55, filed Jan. 3, 2012, pp. 86-103.

DriveCam, User's Manual for DriveCam Video Systems, HindSight 20/20 Software Version 4.0, S002751-5002804(2003).

"Supplement to DriveCam's Disclosure of Asserted Claims and Preliminary Infringement Contentions" in *DriveCam Inc. v. SmartDrive Systems, Inc.*, Case No. 3:11-CV-00997-H-RBB, for the Southern District of California. Oct. 4, 2011.

"DriveCam's Disclosure of Asserted Claims and Preliminary Infringement Contentions" in *DriveCam, Inc. v. SmartDrive Systems, Inc.*, Case No. 3:11-CV-00997-H-RBB, for the Southern District of California. Aug. 19, 2011.

"Sonic MyDVD 4.0: Tutorial: Trimming video segments", Tutorial for software bundled with Adaptec VideoOh! DVD USB 2.0 Edition, 2003.

Jean (DriveCam vendor), "DriveCam Video Systems—Keeping an Eye on Driving Safety", DriveCam brochure, Nov. 6, 2002, Document #6600126-1.

"DriveCam Video Event Data Recorder", DriveCam brochure, Nov. 6, 2002, Document #6600127.

"DriveCam Video Event Data Recorder", DriveCam brochure, Nov. 6, 2002, Document #6600127-1.

"DriveCam Driving Feedback System", DriveCam brochure, Jun. 12, 2001, Document #6600128.

Jean (DriveCam vendor) "DriveCam Driving Feedback System", DriveCam brochure, Nov. 6, 2002, Document #6600128-1.

"DriveCam Passenger Transportation Module", DriveCam brochure, Oct. 26, 2001.

"HindSight 20/20 Driving Performance Evaluation Software", DriveCam brochure, Nov. 4, 2002, Document #6600135-2.

"DriveCam Driving Feedback System" DriveCam brochure, Mar. 15, 2004.

Del Lisk, "DriveCam Training Seminar" Handout, 2004.

Dan Maher, "DriveCam Taking Risk Out of Driving", DriveCam brochure folder, Jun. 6, 2005.

"User's Manual for DriveCam Video Systems' HindSight 20/20 Software Version 4.0" DriveCam Manual, San Diego, 2003, Document #6600141-1.

"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc. v. SmartDrive Systems, Inc.*, Case No. 3:11-CV-00997-H-RBB, for the Southern District of California. Nov. 8, 2011.

"Responsive Claim Construction and Identification of Extrinsic Evidence of Defendant/Counterclaimant SmartDrive Systems, Inc." Claim Construction and and Extrinsic Evidence in *DriveCam, Inc. v. SmartDrive Systems, Inc.*, Case No. 3:11-CV-00997-H (RBB), for the Southern District of California. Nov. 15, 2011.

D. P. Miller. Evaluation of Vision Systems for Teleoperated Land Vehicles; Control Systems Magazine, IEEE; vol. 8, Issue 3, Jun. 1988, pp. 37-41; Digital Object Identifier 10.1109/37.475.

Franke et al. Autonomous Driving Goes Downtown; Intelligent Systems and Their Applications, IEEE [see also IEEE Intelligent Systems]; vol. 13, Issue 6, Nov.-Dec. 1998, pp. 40-48, Digital Object Identifier 10.1109/5254.736001.

Kamijo et al. A Real-Time Traffic Monitoring System by Stochastic Model Combination; Systems, Man and Cybernetics, 2003, IEEE International Conference on; vol. 4, Oct. 5-8, 2003, pp. 3275-3281 vol. 4.

Kamijo et al. An Incident Detection System Based on Semantic Hierarchy; Intelligent Transportation Systems, 2004; Proceedings. The 7th International IEEE Conference on, Oct. 3-6, 2004, pp. 853-858, Digital Object Identifier 10.1109/ITSC. 2004.1399015.

Lin et al. EEG-Based Drowsiness Estimation for Safety Driving Using Independent Component Analysis; Circuits and Systems I: Regular Papers, IEEE Transactions on, vol. 52, Issue 12, Dec. 2005, pp. 2726-2738; Digital Identifier 10.1109/TCSI.2005.857555.

Veeraraghavan et al. Computer Vision Algorithms for Intersection Monitoring; Intelligent Transportation Systems, IEEE Transactions on; vol. 4, Issue 2, Jun. 2003, pp. 78-89; Digital Identifier 10.1109/TITS2003.821212.

Wijesoma et al. Road Curb Tracking in an Urban Environment; Information Fusion, 2003. Proceedings of the Sixth International Conference of, vol. 1, 2003, pp. 261-268.

US Documents Cited in Office Action for U.S. Appl. No. 11/566,539: U.S. Pat. No. 6,405,340 and U.S. Pat. No. 6,246,933 and US Publication 20040145457.

Amendment filed Dec. 23, 2009 during prosecution of U.S. Appl. No. 11/566,424.

Gallagher et al. "Wireless communications for vehicle safety: Radio link performance and wireless connectivity methods." IEEE Vehicular Technology Magazine 1.4 (2006): 4-24.

Gandhi et al. "Pedestrian protection systems: Issues, survey, and challenges." IEEE Transactions on intelligent Transportation systems 8.3 (2007): 413-430.

Jung et al. "Egomotion estimation in monocular infra-red image sequence for night vision applications." Applications Of Computer Vision, 2007. WACV'07. IEEE Workshop on. IEEE.

Ki et al. "A traffic accident detection model using metadata registry." Software Engineering Research, Management and Applications, 2006. Fourth International Conference on. I.

Munder et al. "Pedestrian detection and tracking using a mixture of view-based shape-texture models." IEEE Transactions on Intelligent Transportation Systems 9.2 (2008): 333-3.

Non-final Office Action mailed Aug. 27, 2009 during prosecution of U.S. Appl. No. 11/566,424.

US Receiving Office, International Search Report, Oct. 15, 2007.

US Receiving Office, Written Opinion of the International Searching Authority, Oct. 15, 2007.

\* cited by examiner

SYSTEM AND METHOD FOR REDUCING DRIVING RISK WITH HINDSIGHT

The present application is a continuation-in-part of U.S. patent application Ser. No. 11/382,222, filed May 8, 2006; Ser. No. 11/382,239, filed May 8, 2006; and Ser. No. 11/382,328, filed May 9, 2006, each of which is incorporated herein by reference in its entirety.

BACKGROUND

1. Field of the Invention

The present invention generally relates to computer assisted forensic analysis of vehicle accidents and more specifically relates to event based reconstruction and review of vehicle accidents to facilitate forensic analysis.

2. Related Art

Conventional systems for conducting forensic analysis of vehicle accidents are necessarily after the fact reconstructions based on informed guesswork after a costly and detailed review of an accident scene. Additionally, analysis of the data produced by these reconstructions is extremely time consuming and expensive, requires a specific skill set developed over significant time, and in the end results in conclusions based on circumstantial evidence gathered after the accident took place. Accordingly, what is needed is an efficient system and method for capturing environmental data leading up, during, and after a vehicle accident to facilitate the forensic analysis of the vehicle accident with relevant real time information.

SUMMARY

The present invention provides a system and method for computer assisted event based reconstruction and forensic analysis of vehicle accidents. The system comprises an event capture device that records audio, video, and other information that collectively comprise an event. The event data, including the audio, video, and other related information, is provided to an evaluation server where it is stored in a database for storage and later forensic analysis of the events comprising the vehicle accident.

In one embodiment, data for a specific automobile accident event can be analyzed and compared to similar type of automobile accident event data in order to forensically analyze the specific event and determine the cause of the accident. Advantageously, information about the circumstances surrounding the event is captured during the event to provide an analyst with objective information about the event as it took place. For example, specific information may include (but are not limited to) the GPS location of the vehicle, the G-forces acting on the vehicle, the speed and direction of the vehicle, operation or status of vehicle systems such as lights or brakes or engine, and audio and video data from the vehicle during the automobile accident.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for reducing driving risk that capture driving events and provide those events to an evaluation server where the events are analyzed and reported to management and also compiled into coaching sessions for individuals or groups of drivers to receive in order to demonstrate to them how to avoid risky behaviors while driving. For example, one method as disclosed herein allows for an event capture device to capture an event and send the event via a communication network to an evaluation server. The evaluation server allows an analyst to review the raw event data and create a coaching session directed toward future avoidance of the risky behavior that caused the event. Additionally, the evaluation server compiles reports regarding the events for particular drivers or groups of drivers. The reports are then provided to management by the evaluation server and the coaching sessions are provided to the individual drivers or groups of drivers to improve their future avoidance of risky driving behaviors.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
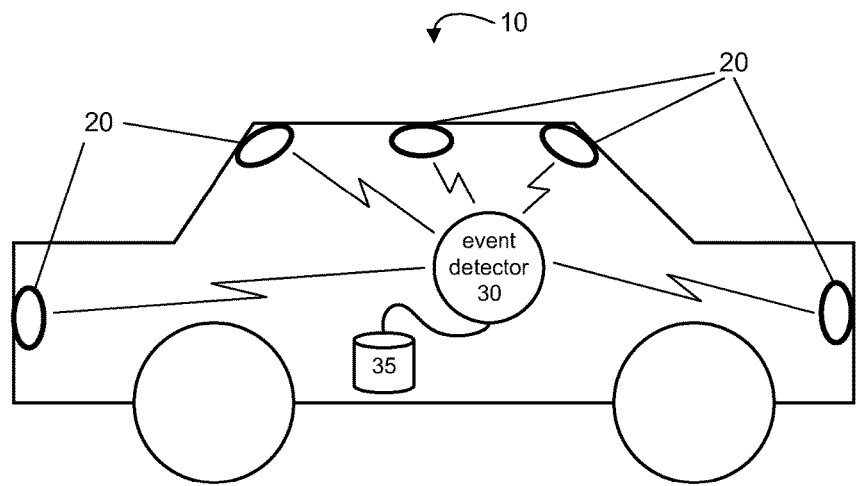
FIG. 1 is a block diagram illustrating an example event detector in control of a plurality of event capture devices deployed in a vehicle according to an embodiment of the present invention.

FIG. 1 is a block diagram illustrating an example event detector 30 in control of a plurality of event capture devices 20 deployed in a vehicle 10 according to an embodiment of the present invention. In the illustrated embodiment, the event detector 30 is integrated with the vehicle 10 and is communicatively coupled with the event capture devices 20. The event detector 30 is also configured with data storage 35.

The event detector 30 can be any of a variety of types of computing devices with the ability to execute programmed instructions, receive input from various sensors, and communicate with one or more internal or external event capture devices 20 and other external devices (not shown). An example general purpose computing device that may be employed as all or a portion of an event detector 30 is later described with respect to FIG. 17. An example general purpose wireless communication device that may be employed as all or a portion of an event detector 30 is later described with respect to FIG. 16.

When the event detector 30 identifies an event, the event detector 30 instructs the one or more event capture devices 20 to record pre-event data, during the event data, and post-event data that is then provided to the event detector 30 and stored in the data storage area 35. Events may comprise a variety of situations, including automobile accidents, reckless driving, rough driving, or any other type of stationary or moving occurrence that the owner of a vehicle 10 may desire to know about.

The vehicle 10 may have a plurality of event capture devices placed in various locations around the vehicle 10. An event capture device 20 may comprise a video camera, still camera, microphone, and other types of data capture devices. For example, an event capture device 20 may include an accelerometer that senses changes in speed or direction. Additional sensors and/or data capture devices may also be incorporated into an event capture device 20 in order to provide a rich set of information about a detected event.

The data storage area 35 can be any sort of internal or external, fixed or removable memory device and may include both persistent and volatile memories. The function of the data storage area 35 is to maintain data for long term storage and also to provide efficient and fast access to instructions for applications or modules that are executed by the event detector 30.

In one embodiment, event detector 30 in combination with the one or more event capture devices 20 identifies an event and stores certain audio and video data along with related information about the event. For example, related information may include the speed of the vehicle when the event occurred, the direction the vehicle was traveling, the location of the vehicle (e.g., from a global positioning system ("GPS") sensor), and other information from sensors located in and around the vehicle or from the vehicle itself (e.g., from a data bus integral to the vehicle such as an on board diagnostic ("OBD") vehicle bus). This combination of audio, video, and other data is compiled into an event that can be stored in data storage 35 onboard the vehicle for later delivery to an evaluation server.

Figure 2:
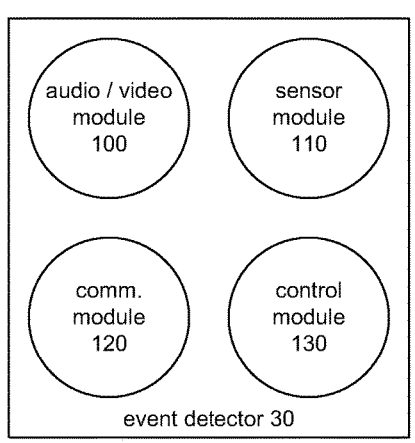
FIG. 2 is a block diagram illustrating an example event detector according to an embodiment of the present invention.

FIG. 2 is a block diagram illustrating an example event detector 30 according to an embodiment of the present invention. In the illustrated embodiment, the event detector 30 comprises an audio/video ("AV") module 100, a sensor module 110, a communication module 120, and a control module 130. Additional modules may also be employed to carry out the various functions of the event detector 30, as will be understood by those having skill in the art.

The AV module 100 is configured to manage the audio and video input from one or more event capture devices and storage of the audio and video input. The sensor module 110 is configured to manage one or more sensors that can be integral to the event detector 20 or external from the event detector 20. For example, an accelerometer may be integral to the event detector 20 or it may be located elsewhere in the vehicle. The sensor module 110 may also manage other types of sensor devices such as a GPS sensor, temperature sensor, moisture sensor, or the like (all not shown).

The communication module 120 is configured to manage communications between the event detector 20 and other devices and modules. For example, the communication module 120 may handle communications between the event detector 20 and the various event capture devices. The communication module 120 may also handle communications between the event detector 20 and a memory device, a docking station, or a server such as an evaluation server. The communication module 120 is configured to communicate with these various types of devices and other types of devices via a direct wire link (e.g., USB cable, firewire cable), a direct wireless link (e.g., infrared, Bluetooth, ZigBee), or a wired or any wireless network link such as a local area network ("LAN"), a wide area network ("WAN"), a wireless wide area network ("WWAN"), an IEEE 802 wireless network such as an IEEE 802.16 ("WiFi") network, a WiMAX network, satellite network, or a cellular network.

The control module 130 is configured to control the actions or remote devices such as the one or more event capture devices. For example, the control module 130 may be configured to instruct the event capture devices to capture an event and return the data to the event detector when it is informed by the sensor module 110 that certain trigger criteria have been met that identify an event.

Figure 3:
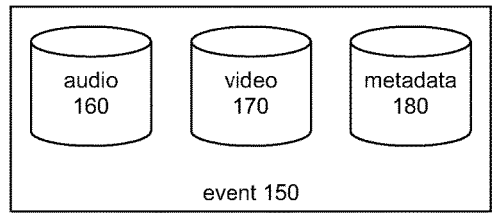
FIG. 3 is a block diagram illustrating an example event according to an embodiment of the present invention.

FIG. 3 is a block diagram illustrating an example event 150 according to an embodiment of the present invention. In the illustrated embodiment, the event 150 comprises audio data 150, video data 160, and metadata 180. The audio data 150 can be collected from inside the vehicle, outside the vehicle, and may include information from an internal vehicle bus about the baseline noise level of the operating vehicle, if such information is available. Additional information about baseline noise level, radio noise level, conversation noise level, or external noise level may also be included in audio data 160.

Video data 170 may include still images or moving video captured by one or more cameras in various locations in and around the vehicle. Video data 170 may include images or video from inside the vehicle, outside the vehicle, or both. In one particularly advantageous embodiment, still images and moving video that illustrate the entire area inside the vehicle and the entire 360 degree area surrounding the vehicle are captured by a plurality of image capture devices and included in video data 170.

Metadata 180 may include a variety of additional information that is available to the event detector 30 at the time of an event. Such additional data may include, but is not limited to, the velocity and direction of the vehicle, the GPS location of the vehicle, elevation, time, temperature, and vehicle engine and electrical component information, status of vehicle lights and signals, brake operation and position, throttle position, etc. captured from an internal vehicle bus, just to name a few. Additional information may also be included such as the number of occupants in the vehicle, whether seatbelts were fastened, whether airbags deployed, whether evasive maneuvering was attempted as determined by the route of the vehicle prior to the event. The specific identification of the driver may also be included, for example as read by the event detector from a radio frequency identification ("RFID") badge worn by the driver or integrated with a vehicle key assigned to the driver. As will be understood by those skilled in the art, metadata 180 may include an extremely rich variety of information limited only by the scope and type of information obtained prior to, during, and after an event.

Figure 4A:
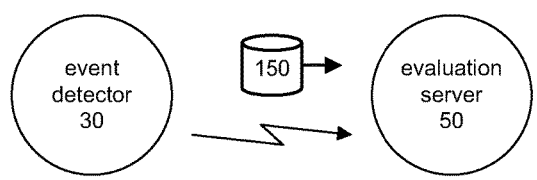
FIG. 4A is a block diagram illustrating an example event traveling from an event detector to an evaluation server according to an embodiment of the present invention.

FIG. 4A is a block diagram illustrating an example event 150 traveling from an event detector 30 to an evaluation server 50 according to an embodiment of the present invention. In one embodiment, events such as event 150 are captured by an event detector 30 and stored locally until they are provided to the evaluation server 50. The means by which an event 150 can be provided to the evaluation server 50 can vary. In various embodiments (or in a single embodiment), an event 150 may be provided from event detector 30 to evaluation server 50 by way of a portable media device, a direct wire link, a direct wireless link, an indirect wire link, an indirect wireless link, or any combination of these. Event 150 may be secured by encryption of the event 150 data structure and/or a secure channel between the event detector 30 and the evaluation server 50.

For example, a portable media device may include a USB drive, compact disc, thumb drive, media card, or other similar type of device. A direct wire link may include a USB cable, a firewire cable, an RS-232 cable, or the like. A direct wireless link may include an infrared link, a Bluetooth link, ZigBee link, or an IEEE 802.11 point-to-point link, a WiMAX link, or a cellular link, just to name a few. An indirect wired link may include a packet switched or circuit switched network connection configured for conveyance of data traffic. An Ethernet network connection is an example of a packet switched indirect wired link and a dial up modem connection is an example of a circuit switched indirect wired link, both of which may be configured for conveyance of data traffic.

Figure 4B:
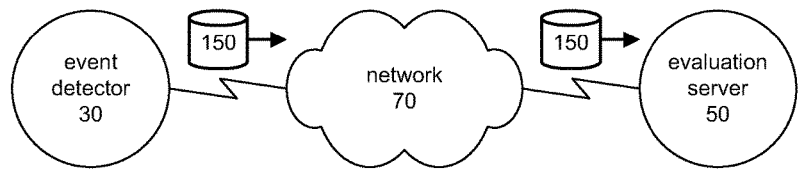
FIGS. 4B-4D are network diagrams illustrating example routes for an event traveling from an event detector to an evaluation server according to various embodiments of the present invention.
Figure 4C:
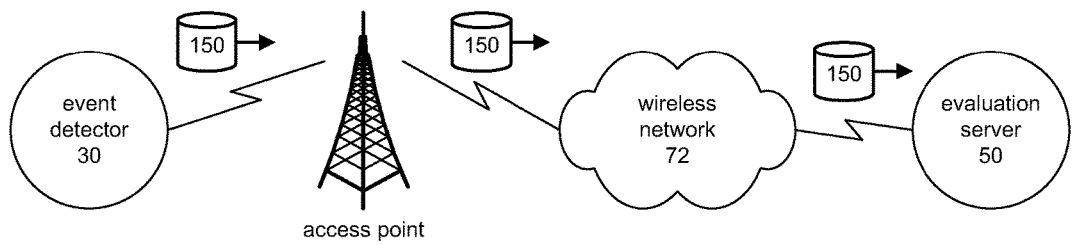
Figure 4D:
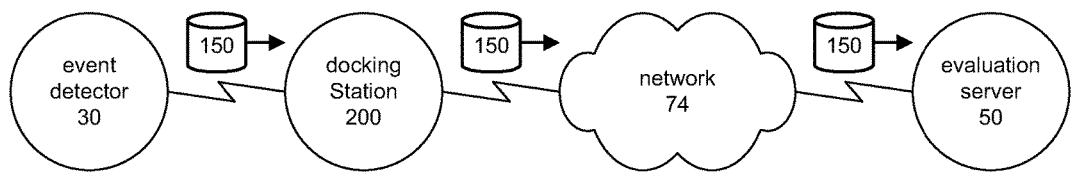

The following FIGS. 4B-4D illustrate various embodiments for providing events to an evaluation server.

FIG. 4B is a network diagram illustrating an example route for an event 150 traveling from an event detector 30 to an evaluation server 50 according to an embodiment of the present invention. In the illustrated embodiment, the event 150 travels over a network 70 from the event detector 30 to the evaluation server 50. The network 70 may comprise any of a variety of network types and topologies and any combination of such types and topologies. For example, the network 70 may comprise a plurality of networks including private, public, circuit switched, packet switched, personal area networks ("PAN"), local area networks ("LAN"), wide area networks ("WAN"), metropolitan area networks ("MAN"), satellite network, or any combination of the these. Network 70 may also include that particular combination of networks ubiquitously known as the Internet.

FIG. 4C is a network diagram illustrating an example route for an event 150 traveling from an event detector 30 to an evaluation server 50 according to an embodiment of the present invention. In the illustrated embodiment, the event 150 travels to a wireless network 72 by way of an access point 210 and then on to the evaluation server 50 via the wireless network 72. The access point 210 may provide access via many different wireless network protocols as will be well understood by those having skill in the art. The wireless network 72 may be a WWAN or a WiFi network. The link between the event detector 30 and the access point 210 may be a short range direct link or a wide range direct link. The access point 210 may be a large radio tower device or a small in-home wireless appliance. The wireless network 72 may include over the air segments and also wired segments. For example, the last mile segments of wireless network 72 may be over the air while internal and back end segments may be wired segments. In one embodiment, the wireless network 72 may provide a wireless interface to the event detector 30 and then have a wired interface on the back end to the Internet, which in turn connects the evaluation server 50.

FIG. 4D is a network diagram illustrating an example route for an event 150 traveling from an event detector 30 to an evaluation server 50 according to an embodiment of the present invention. In the illustrated embodiment, a docking station 200 is disposed between the event detector and the network 74. In such an embodiment, an event 150 may be provided from the event detector 30 to the docking station 200 via a variety of means as described above, including portable media, direct wired or wireless link, and indirect wired or wireless link. The event detector 30 may also be physically coupled with the docking station 200 to convey the event 150 from the event detector 30 to the docking station 200. Once the event 150 is received by the docking station 200, the event is then sent over the network 74 to the evaluation server 50. In the illustrated embodiment, the network 74 may be a wired or wireless network or a combination of the two. The network 74 may also be private or public in whole or in part and may also include the Internet.

Figure 5:
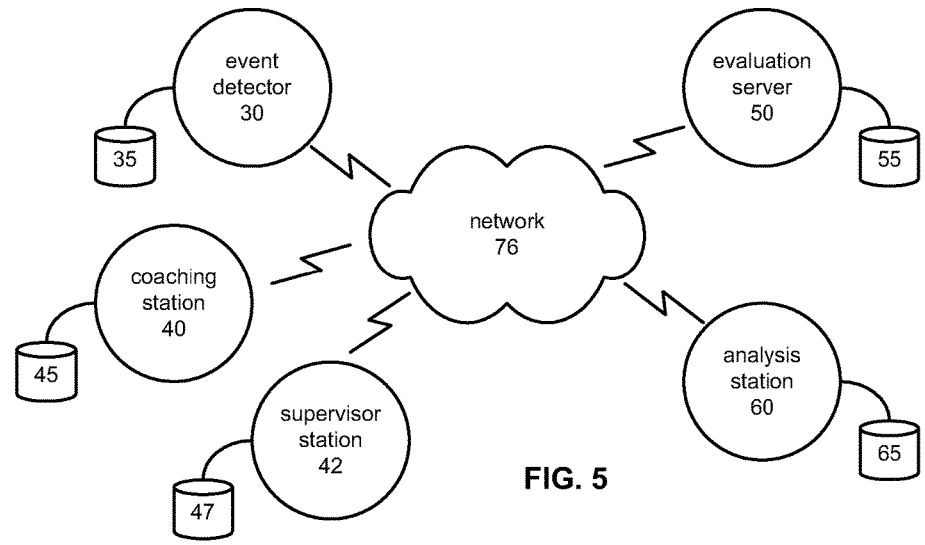
FIG. 5 is a network diagram illustrating an example system for reducing driving risk according to an embodiment of the present invention.

FIG. 5 is a network diagram illustrating an example system for driver improvement according to an embodiment of the present invention. In the illustrated embodiment, the system includes an event detector 30, a coaching station 40, a supervisor station 42, an evaluation server 50, and an analysis station 60, each coupled with a data storage area 35, 45, 47, 55, and 65, respectively. Additional event detectors 30, coaching stations 40, supervisor stations 42, evaluation servers 50, and analysis stations 60 may also be included.

The function of the event detector 30 is to identify and capture a plurality of events and send a data structure representing the audio, video, and other data related to the event to the evaluation server 50. The evaluation server maintains the captured events and provides them to the analysis station 60 where the events are reviewed. The analysis station 60 may be configured with certain hardware and software modules that allow an operator to review event data (e.g., audio, video, and metadata) in order to make an analysis related to the event and create summary reports and the like.

After an event is reviewed, it may be discarded, incorporated into a coaching session, flagged for follow up, flagged for inclusion in one or more reports, or otherwise maintained for later coaching, reporting, or analysis. In one embodiment, certain portions of one or more events may be incorporated into a report or a coaching session and then sent back to the evaluation server 50 for storage.

The coaching station 40 is configured to play coaching sessions to a particular driver in order to educate the driver about his or her risky driving behavior and suggest alternative driving techniques that the driver may employ to reduce such risky behavior. The coaching station 40 can access coaching sessions from the evaluation server 50 via the network 76 to view the coaching session. The supervisor station 42 is configured to allow executives, managers, and supervisors to access reports on the evaluation server over network 76 and view coaching sessions and reports regarding driver behavior. In one embodiment, a conventional web browser utility can be used at either the coaching station 40 or the supervisor station 42 to view both reports and coaching stations, thereby making either device a coaching station or a supervisor station based on the type of information that is accessed from the evaluation server.

Figure 6:
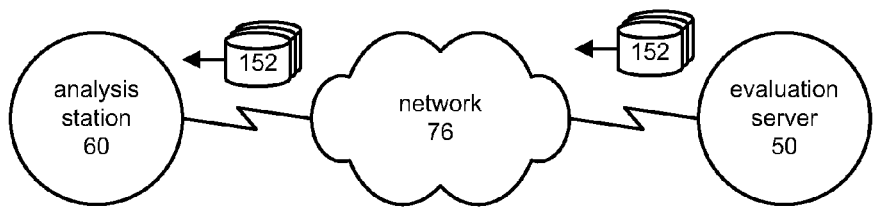
FIG. 6 is a network diagram illustrating an example route for a group of events traveling from an evaluation server to an analysis station according to an embodiment of the present invention.

FIG. 6 is a network diagram illustrating an example route for a group of events 152 traveling from an evaluation server to an analysis station according to an embodiment of the present invention. In the illustrated embodiment, the group of events 152 is provided by the evaluation server 50 to the analysis station 60 via the network 76. On the evaluation server, the group of events 152 may be identified by searching for all events that pertain to a particular driver. This may be accomplished by associating each event at the time it is captured with a particular driver. For example, the driver of a vehicle may have a unique identifier and that unique identifier may be included as part of the metadata for each event that is captured while that driver is operating the vehicle. In one embodiment, the driver identifier may be obtained by the event detector by reading an infrared identification device, perhaps incorporated into the driver's identification badge or by receiving the identifier as input when the driver begins the shift, or by reading the identifier from a media card or other wired or wireless device associated with the driver.

Groups of events 152 may also be identified by all events associated with a particular company, a particular shift, a particular supervisor, or other reporting structure or working structure combinations. Such a group of events 152, once provided to the analysis station 60 can then be analyzed by an operator that reviews each event to identify those events that need to be reported or shown to the driver, for example as part of a coaching station.

Figure 7:
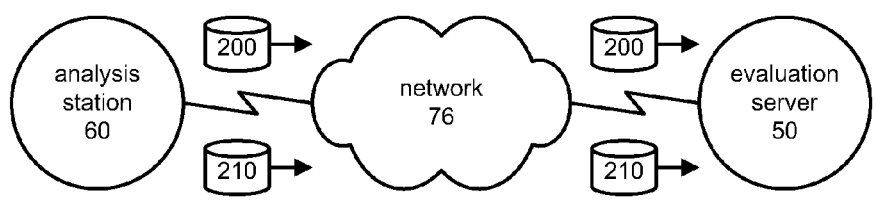
FIG. 7 is a network diagram illustrating an example route for a coaching session and an event report traveling from an analysis station to an evaluation sever according to an embodiment of the present invention.

FIG. 7 is a network diagram illustrating an example route for a coaching session 200 and an event report 210 traveling from an analysis station 60 to an evaluation server 50 according to an embodiment of the present invention. In the illustrated embodiment, an operator at the analysis station 60 may create a coaching session 200 that is made up of all or a portion of a plurality of events (audio, video, and metadata). The coaching session 200 may also include notes/comments from an operator who analyzed the event data or notes/comments from a supervisor or manager or executive. Such a coaching session 200 may be directed to an individual driver, a shift of drivers, or other classes of drivers for which the session may be beneficial (e.g., night time drivers, truck drivers, drivers of vehicles with trailers, etc.). The coaching session may also be directed to supervisors or managers or executives.

Additionally, the operator may also create a report 210 that is made up of summary information about all notable events. A notable event may be characterized as any event that the vehicle owner wants to know about. In one embodiment, there can be certain variable criteria that each vehicle owner can set in order to determine the risk level for events that are compiled into a report 210. Additionally, a report 210 may be created that includes information about all captured events, whether the event reflects a pothole or an automobile accident.

As shown in the illustrated embodiment, one or more coaching sessions 200 and reports 210 can be provided from the analysis station 60 to the evaluation server 50. These coaching sessions and reports can then be maintained at the evaluation server 50 for later viewing by executives, managers, supervisors, drivers, and the like. Such reports 210 and coaching sessions 200 can also be compiled onto a portable media such as a CD for viewing by new employees during orientation sessions.

Figure 8:
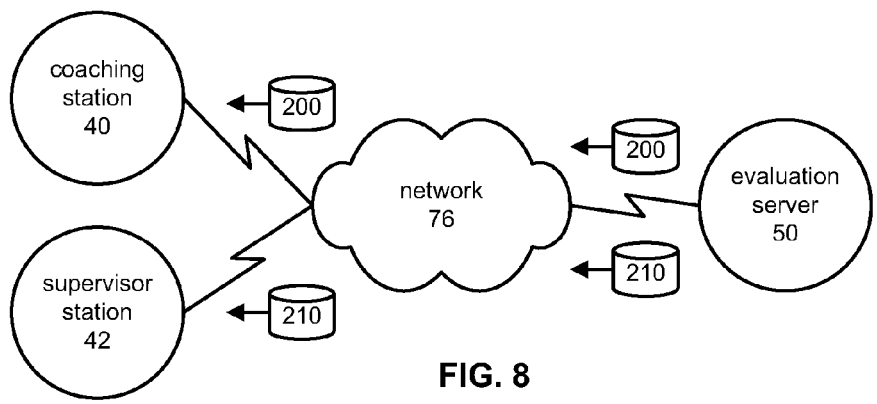
FIG. 8 is a network diagram illustrating an example route for a coaching session and an event report traveling from an evaluation sever to a coaching station and a supervisor station according to an embodiment of the present invention.

FIG. 8 is a network diagram illustrating an example route for a coaching session 200 and an event report 210 traveling from an evaluation sever 50 to a coaching station 40 and a supervisor station 42 according to an embodiment of the present invention. In the illustrated embodiment, the coaching session 200 and report 210 travel to one or more coaching stations 40 and supervisor stations 42 over network 76. Although as shown the report 210 goes to the supervisor station 42 and the coaching session 200 goes to the coaching station 40, reports and coaching sessions can be sent to any remote device for review. In one embodiment, a conventional web browser utility can be used at a remote station to view both reports and coaching stations, thereby making the device both a coaching station and a supervisor station based on the type of information that is accessed from the evaluation server.

Figure 9:
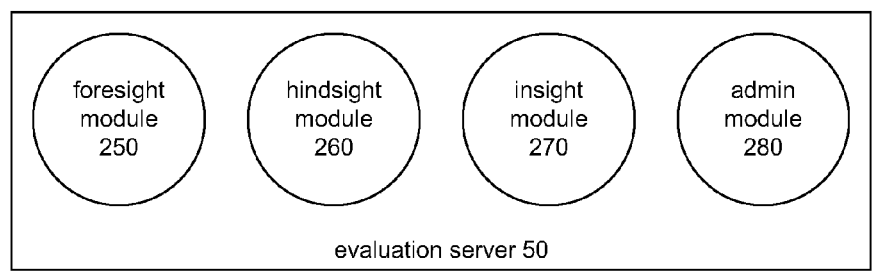
FIG. 9 is a block diagram illustrating an example evaluation server according to an embodiment of the present invention.

FIG. 9 is a block diagram illustrating an example evaluation server 50 according to an embodiment of the present invention. In the illustrated embodiment, the evaluation server 50 comprises a foresight module 250, a hindsight module 260, an insight module 270, and an administrative module 280.

The foresight module 250 is configured to monitor individual driver behavior and objectively score that behavior. The driver score is provided to executives and managers who can use that information to make informed decisions about behavior modification to eliminate or reduce risky behavior of an individual driver. Advantageously, reducing or eliminating risky behavior of a fleet of drivers may have a significant effect on the cost of insurance for the owner of the fleet of vehicles being driven.

The hindsight module 260 is configured to capture and store event data related to accidents, crashes, and other serious driving events in order to document for use by law enforcement in forensic analysis and insurance companies in coverage disputes. Advantageously, the captured event information provides a purely objective reconstruction of what happened prior to, during, and after an event.

The insight module 270 is configured to aggregate event data into a database of driving events and correlate information in the database to identify trends in driving behavior that relate to risk factors. For example, information about the vehicle and its various components, the driver and occupants, the driving conditions, the driving environment, and other useful data can be employed. The insight module 270 is additionally configured to correlate cause and effect relationships between data points and determine the effect of those relationships upon driver safety. The insight module 270 additionally compares these correlations and driver safety trends with historical event information for individual drivers to provide a driver rating or driver score for an individual driver. The driver score can be used by insurance companies to establish individualized insurance rates.

Figure 10:
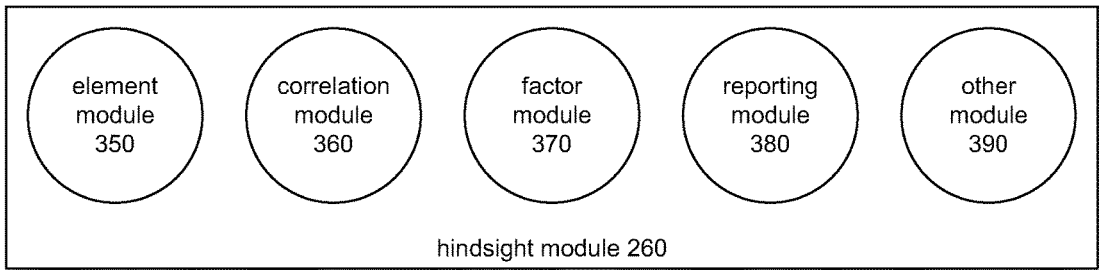
FIG. 10 is a block diagram illustrating an example hindsight module according to an embodiment of the present invention.

FIG. 10 is a block diagram illustrating an example hindsight module according to an embodiment of the present invention. In the illustrated embodiment, the hindsight module 260 comprises a key element module 350, a correlation module 360, a factor module 370, a reporting module 380, and an other module 390.

The element module 350 is configured to identify particular elements in one or more events that comprise a vehicle accident. For example, an element may include the temperature or other weather related conditions (e.g., if it was raining), the number of vehicle occupants, road conditions (icy, wet, unpaved), traffic conditions (heavy, light), driving conditions (traffic light, stop sign, yield sign, one way street, divided highway, merging traffic, etc.), vehicle status (speed, accelerating, decelerating), interior noise level, and the like. Advantageously, discrete data points related to one or more events comprising a vehicle accident can each be an element.

The element module is configured to identify such elements from the one or more events that comprise a vehicle accident. This can be accomplished by reviewing metadata, the audio playback, and the video playback for the one or more events. The review can be conducted by an operator or by automated computer analysis. For example, the decibel level on the audio track can be analyzed by computer to determine the sound level inside the vehicle at certain times during the one or more events. Similarly, computer analysis of metadata fields can provide temperature information, vehicle status information (e.g., speed), and other information collected from an OBD vehicle bus without operator intervention. Similarly, the video track can be analyzed for indicators that point to elements of the vehicle accident, for example, significant color changes from frame to frame over large portions of the frame may indicate a rapid change in direction of the vehicle. Advantageously, other computer facilitated analyses of the audio, video, and metadata information related to the one or more events can be performed without an operator. Additionally, elements can also be identified by an operator reviewing the one or more events that comprise a vehicle accident.

The correlation module 360 is configured to manage a data storage area of historical correlations and identify causation and/or contributory correlations between elements and vehicle accidents. Advantageously, correlation module 360 is configured to automatically review vehicle accident event data and elements identified by the element module 350 on an ongoing basis to further identify and refine causal and contributory correlations between one or more elements or combinations of elements and accidents.

For example, the correlation module 360 may receive a group of elements from the element module 350 and analyze those elements to determine that the ice on the road caused the vehicle to crash. In one embodiment, the correlation module 360 analyzes each of the elements identified from one or more events of a vehicle accident and compares those elements to causal and contributory correlations stored in a data storage area accessible to the correlation module, e.g., in the data storage area of the evaluation server. By making such comparisons and identifying the elements that are present, the correlation module 360 can categorize the elements related to the vehicle accident, for example, those elements that are possibly causal and those elements that are possible contributory.

The factor module 370 is configured to receive information from the element module 350 and the correlation module 360 and identify those elements that are the likely factors that caused or contributed to the cause of the vehicle accident. For example, the element module 350 may identify certain elements related to an accident such as icy road conditions and vehicle speed within the posted speed limit. The correlation module 360 may categorize the ice road conditions as possibly causal and categorize normal vehicle speed as unrelated. The factor module 370 may review the information from the element module 350 and the correlation module 360 and determine that the speed of the vehicle was the likely factor that caused the vehicle accident because the speed was too great under the specific conditions of the road.

Advantageously, the factor module 370 may also maintain a data storage area of historical factors that are continuously refined and updated so that future factor comparisons and judgments made by computer analysis can be more accurate.

Reporting module 330 is configured to compile reports based on individual and aggregate event data. Reports may be compiled for an individual driver, a particular shift, all day time drivers, all night time drivers, all twilight drivers (morning and evening), all drivers of particular vehicle types, and other groupings. These reports can be provided to supervisors, managers, and executives. The reports may also be provided to the individual drivers, for example, a report of the individual driver's events for the previous month, a report of a particularly significant individual event, etc. Advantageously, reports can be included as part of a coaching session to provide the viewer with concise summary data about the events in the coaching session.

In one embodiment, reports can be targeted for drivers, supervisors, managers, executives, public relations (e.g., reporters/press), insurance companies, government agencies, legal authorities, legal representatives and the like. The reports may be used for a variety of purposes, including supplemental coaching of drivers to emphasize the benefits of reducing risky driving behavior.

Additional functionality may also be included in the hindsight module 260, as indicated by the other module 390. The other module 390 may be configured to perform a variety of tasks, including but not limited to: scoring driver behavior before during and after the accident, identifying the presence of additional passengers in the vehicle, integration and assimilation of accident event data into a common data storage area; and mining of accident event data from the data storage area, just to name a few.

Figure 11:
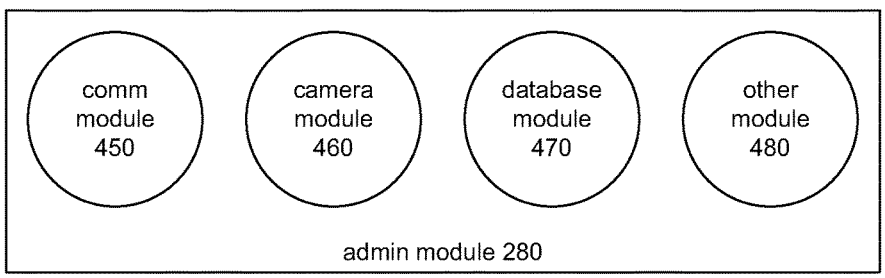
FIG. 11 is a block diagram illustrating an example administrative module according to an embodiment of the present invention.

FIG. 11 is a block diagram illustrating an example administrative module 280 according to an embodiment of the present invention. In the illustrated embodiment, the administrative module 280 comprises a communication module 450, an event detector module 460, a database module 470, and an other module 480.

In one embodiment, the communication module 450 is configured to manage communications between the evaluation server 50 and the various stations and event detectors that are part of the system for reducing driving risk. For example, the communication module 450 may manage communications with individual event detectors, analysis stations, coaching stations, supervisor stations, docking stations, and the like.

Additionally, communication module 450 may also manage communications between the various modules of the evaluation server 50. For example, communications between the foresight, hindsight, and insight modules may be managed by communication module 450. The communication module 450 is configured to manage wireless and wired communications and send and receive communications over a wired or wireless network.

The communication module 450 is configured to send and receive communications to and from an event detector device, either directly or indirectly. For example, communications with an event detector device may take place through a docking station or a server that aggregates event data from multiple event detector devices before sending the event data to the evaluation server.

The event detector module 460 is configured to manage individual and groups of event detectors. In one embodiment, the event detector module 460 may manage software versions that are resident on individual event detector devices so that the overall system may be kept up to date with respect to the versions of software deployed in the field.

Event detector module 460 may also track the individual event detectors that have provided event data or otherwise reported back to the evaluation server during a given time period. For example, event detector module 460 may track those event detectors that have reported in during each day and provide summary reports so that managers and supervisors can determine if event data from each vehicle in use is being sent to the evaluation server. In one embodiment, the event detector module 460 may attempt to contact an individual event detector in order to determine the status of the event detector. Advantageously, the evaluation server can determine the efficacy of the overall system by periodic confirmation of the status of each event detector. If the event detector module 460 determines that a particular event detector is not working properly, then that event detector may be identified as needing service or replacement.

Database module 470 is configured to manage a database of information related to reducing driving risk. For example, event data, coaching sessions, and reports can be maintained in a data storage area by database module 470. Additionally, related information from sources other than event detectors and analysis stations may also be managed by the database module 470. For example, weather information can be obtained from third party sources and stored to provide objective information about the weather conditions during a particular event. Additional information may also include traffic congestion information and smog/visibility information. Other beneficial information may also be included and managed by database module 470.

Additional functionality may also be included in the administrative module 280, as indicated by the other module 480. The other module 480 may be configured to perform a variety of tasks, including but not limited to: obtaining related information (e.g., road conditions, traffic conditions, weather, etc.), providing reports about event detector status, and tracking overall system performance and facilitating system maintenance when appropriate.

Figure 12:
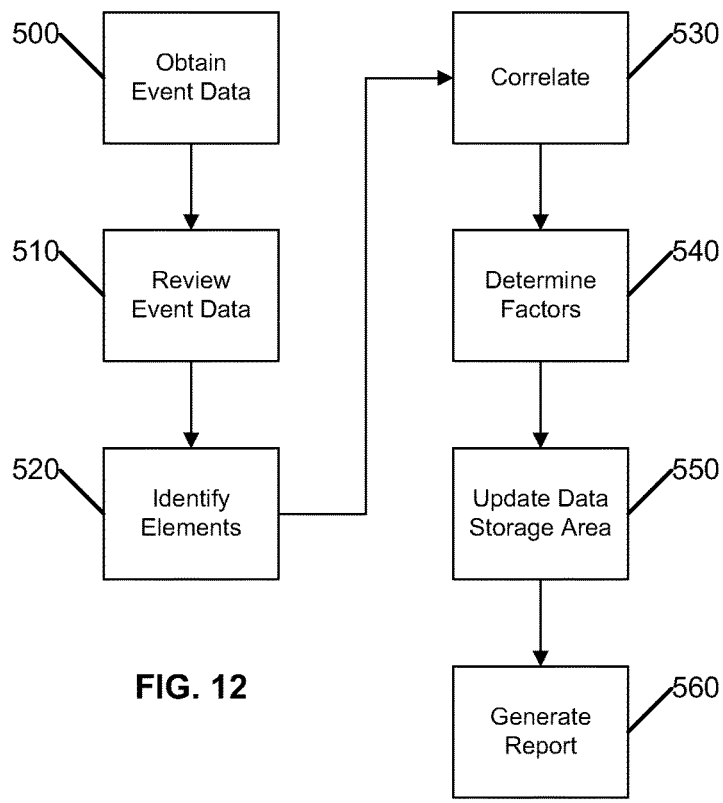
FIG. 12 is a flow diagram illustrating an example process for forensic analysis of a vehicle accident according to an embodiment of the present invention.

FIG. 12 is a flow diagram illustrating an example process for forensic analysis of a vehicle accident according to an embodiment of the present invention. The illustrated process may be carried out by a hindsight module on an evaluation server previously described with respect to FIG. 9 and included in a system such as that previously described with respect to FIG. 5. The forensic analysis may also be carried out on an analysis station such as that described in the system of FIG. 5.

Initially, in step 500 the system obtains event data related to a vehicle accident. The event data may comprise one or more discrete events captured by an event detector in a vehicle, with each event comprising audio, video, and metadata from one or more event capture devices. The event data may be obtained from a data storage area or from a companion application residing on a remote server across a network. The event data may also be obtained directly from one or more event detectors. In one embodiment, the event data may include events from each vehicle involved in the accidents and other vehicles that were near the accident scene and captured information relevant to the event.

Once the event data has been obtained, in step 510 the event data is reviewed. The review may include computerized analysis of audio data, video data, and metadata. The review may also include operator analysis of audio data, video data, and metadata. The review may also include a combination of computerized and operator analysis. In one embodiment, the computerized analysis proceeds automatically and an operator reviews the results of the computerized analysis. Alternatively, the operator may only review certain elements that are flagged by the computerized analysis as potentially benefiting from further operator analysis.

Next, in step 520 event elements are identified. The elements may be from one or more events and may be identified by an operator review or by computerized review. In one embodiment, elements include individual data points that are included in the event data, for example, the weather conditions, speed of the vehicle, location of the vehicle, operational status of the vehicle, etc. Elements may also include audio and video elements. Advantageously, a plurality of elements can be identified by a combination of computerized analysis and operator analysis.

Once the elements have been identified, in step 530 those elements are correlated with historical information about vehicle accidents. For example, the same or similar elements can be analyzed from a historical perspective to determine the likelihood that a particular element was a contributing factor to the vehicle accident or the cause of the vehicle accident. In one embodiment, a database of elements is maintained such that each element includes one or more relative weights that describe how often the particular element is the cause of an accident or a contributing factor to an accident. Relationships between elements may also be tracked historically so that, for example, the presence of a first element in combination with a second element may indicate a cause of a vehicle accident 90% of the time.

Accordingly, in step 540 the particular factors that may have caused the vehicle accident and those that may have contributed to the vehicle accident are determined. In one embodiment, these factors are determined by ranking the relative correlations between identified elements singularly and also in the presence of others. After the factors have been determined, in step 550 the system advantageously updates the data storage area that contains historical element, correlation, and factor data. This allows later forensic analyses to benefit from the aggregate historical data about the various elements, correlations, and factors.

Next, in step 560 the system can generate a forensic analysis report that details all of the information collected and analyzed and determined about the vehicle accident. In one embodiment, the report may be a multimedia document that includes audio, video, and other data that steps through (under computer control) the vehicle accident and plays audio and video data and displays critical information to provide an objective reconstruction of the vehicle accident and highlight the various factors that may be causal or contributory. Advantageously, such a report may be later used by an insurance company, a legal team or the like to convey information about the accident.

Figure 13:
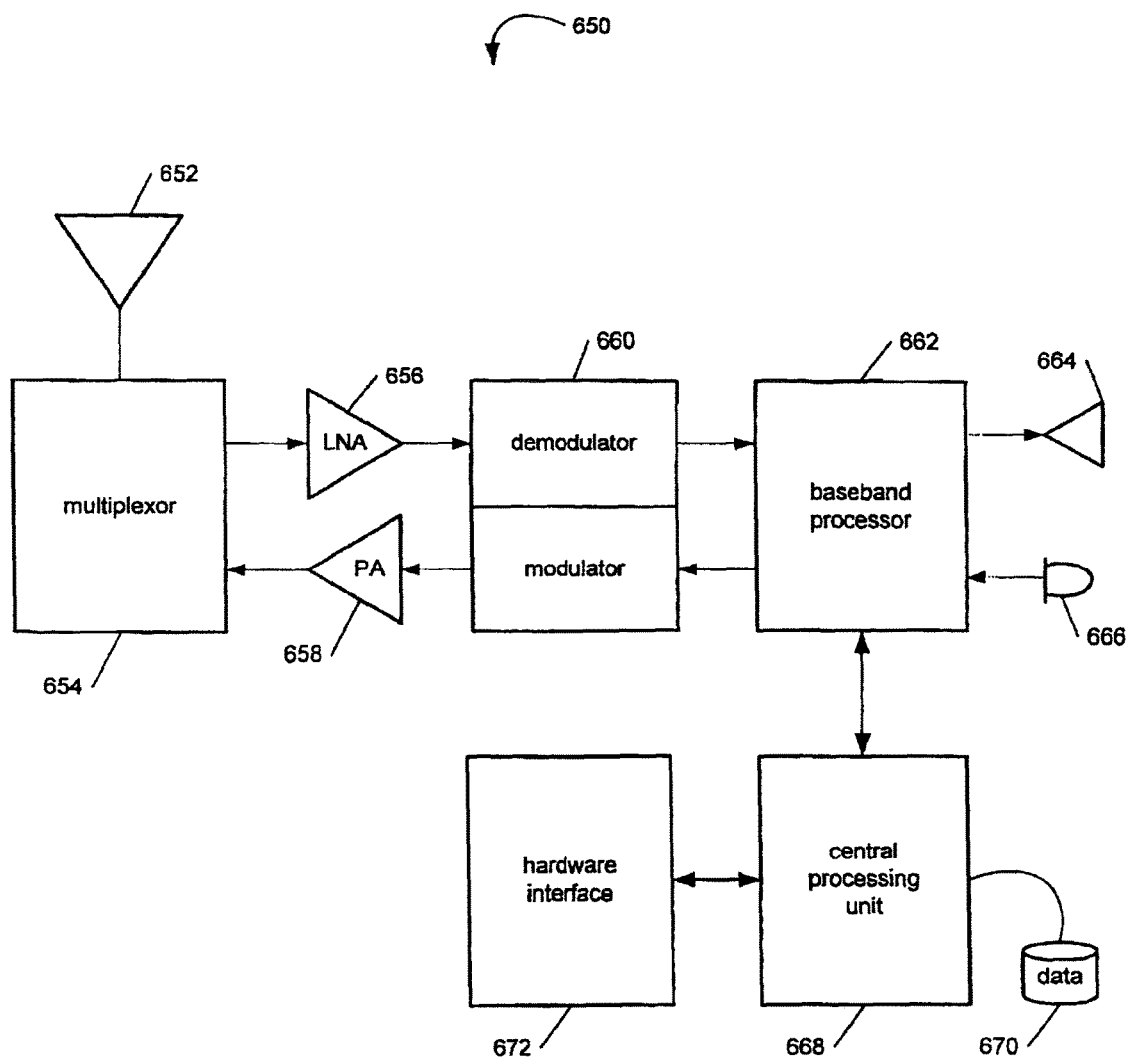
FIG. 13 is a block diagram illustrating an example wireless communication device that may be used in connection with various embodiments described herein.

FIG. 13 is a block diagram illustrating an exemplary wireless communication device 650 that may be used in connection with the various embodiments described herein.

For example, the wireless communication device 650 may be used in conjunction with an event detector previously described with respect to FIG. 1, or an evaluation server, analysis station, coaching station, or supervisor station previously described with respect to FIG. 2. However, other wireless communication devices and/or architectures may also be used, as will be clear to those skilled in the art.

In the illustrated embodiment, wireless communication device 650 comprises an antenna 652, a multiplexor 654, a low noise amplifier ("LNA") 656, a power amplifier ("PA") 658, a modulation circuit 660, a baseband processor 662, a speaker 664, a microphone 666, a central processing unit ("CPU") 668, a data storage area 670, and a hardware interface 672. In the wireless communication device 650, radio frequency ("RF") signals are transmitted and received by antenna 652. Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically modulation circuit 660 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 662.

If the base-band receive audio signal contains audio information, then base-band processor 662 decodes the signal and converts it to an analog signal. Then the signal is amplified and sent to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal that is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit 668. The central processing unit 668 has access to a data storage area 670. The central processing unit 668 is preferably configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

In this description, the term "computer readable medium" is used to refer to any media used to provide executable instructions (e.g., software and computer programs) to the wireless communication device 650 for execution by the central processing unit 668. Examples of these media include the data storage area 670, microphone 666 (via the baseband processor 662), antenna 652 (also via the baseband processor 662), and hardware interface 672. These computer readable mediums are means for providing executable code, programming instructions, and software to the wireless communication device 650. The executable code, programming instructions, and software, when executed by the central processing unit 668, preferably cause the central processing unit 668 to perform the inventive features and functions previously described herein.

The central processing unit is also preferably configured to receive notifications from the hardware interface 672 when new devices are detected by the hardware interface. Hardware interface 672 can be a combination electromechanical detector with controlling software that communicates with the CPU 668 and interacts with new devices.

Figure 14:
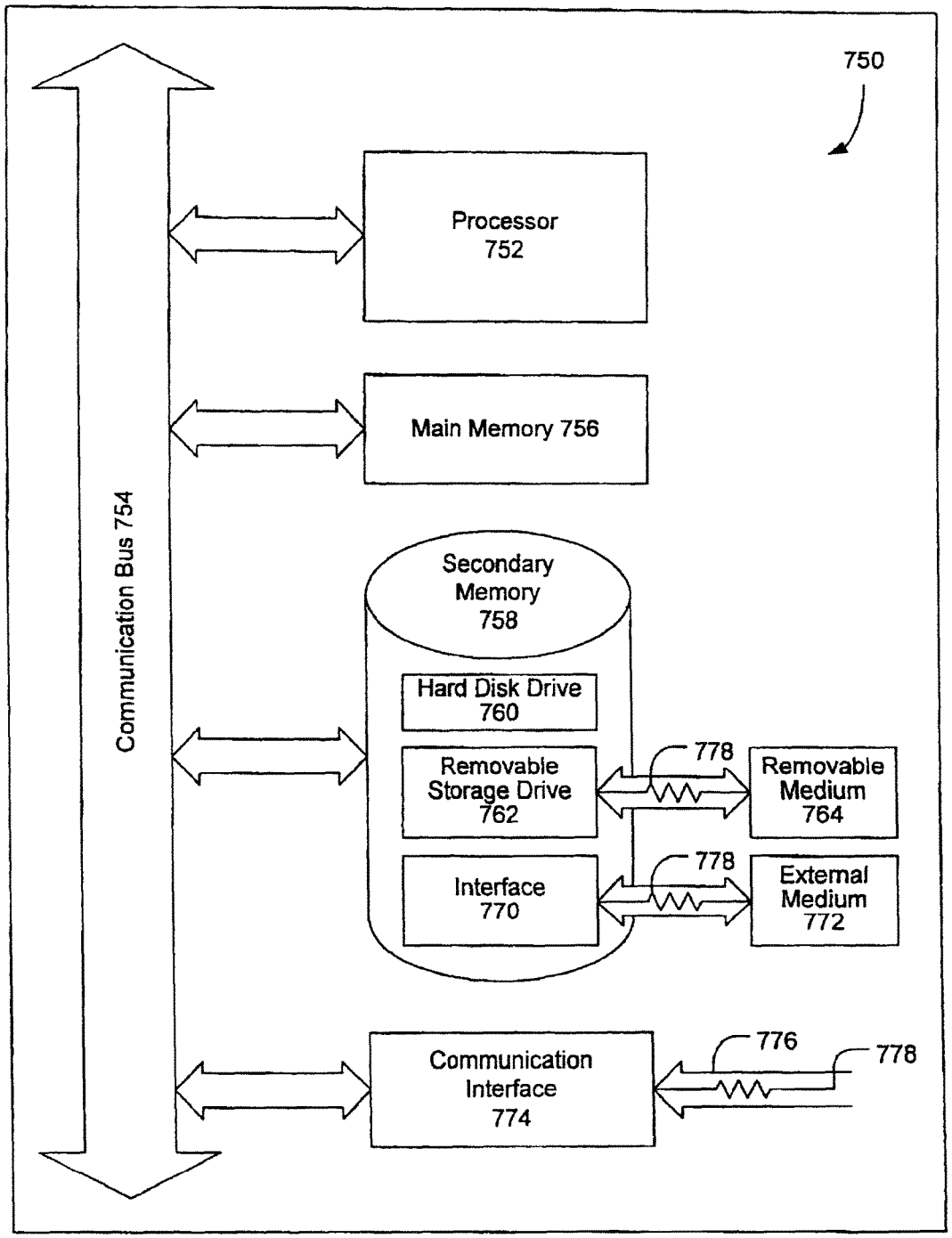
FIG. 14 is a block diagram illustrating an example computer system that may be used in connection with various embodiments described herein.

FIG. 14 is a block diagram illustrating an exemplary computer system 750 that may be used in connection with the various embodiments described herein. For example, the computer system 750 may be used in conjunction with an event detector previously described with respect to FIG. 1, or an evaluation server, analysis station, coaching station, or supervisor station previously described with respect to FIG. 2. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus (not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, mini PCI express, or standards promulgated by the Institute of Electrical and Electronics Engineers ("IEEE") including IEEE 488 general-purpose interface bus ("GPIB"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 758 may optionally include a hard disk drive 760 and/or a removable storage drive 762, for example a floppy disk drive, a magnetic tape drive, a compact disc ("CD") drive, a digital versatile disc ("DVD") drive, etc. The removable storage drive 762 reads from and/or writes to a removable storage medium 764 in a well-known manner. Removable storage medium 764 may be, for example, a floppy disk, magnetic tape, CD, DVD, memory stick, USB memory device, etc.

The removable storage medium 764 is preferably a computer readable medium having stored thereon computer executable code (i.e., software) and/or data. The computer software or data stored on the removable storage medium 764 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive, or and external magneto-optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory. Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g. printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772), and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer-implemented method to generate a report of a vehicle accident, comprising:
    capturing driving event data using an event detector in communication with an event capture device coupled to a vehicle, wherein the driving event data is associated with a vehicle accident, wherein the driving event data is selectively captured in response to a trigger by the event detector and comprises at least video data, audio data, metadata fields, and vehicle status information from before, during, and after the vehicle accident;
    uploading the driving event data to an evaluation server;
    receiving driving event data at the evaluation server from the event detector;
    identifying one or more elements from the driving event data, wherein the one or more elements comprise individual data points from the driving event data, wherein identifying the one or more elements comprises:
        performing a computer analysis of one of the video data for indicators that point to vehicle accident elements,
        performing a computer analysis of one of the audio data for indicators that point to vehicle accident elements, comprising:
            determining whether decibel level on the audio data indicates an accident has occurred, the audio data being recorded inside the vehicle,
        analyzing metadata fields of the driving event data for temperature conditions as one of the one or more elements,
        analyzing the driving data for vehicle status information as one of the one or more elements, wherein vehicle status information comprises speed and acceleration data before and during the accident, and
        flagging elements determined by the computer analysis to be vehicle accident elements;
    receiving historical information from a database, wherein the historical information comprises prior captured driving event data elements, and a plurality of correlations that describe how often a particular element of the prior captured driving event data elements is an accident causal factor;
    correlating the one or more elements to the prior captured driving event data elements and the plurality of correlations;
    determining one or more factors that contributed to a cause of the vehicle accident, comprising:
        determining a first correlation relating to how often a first element of the prior captured driving event data elements is a first accident causal factor;
        determining a second correlation relating to how often a second element of the prior captured driving event data elements is a second accident causal factor;
        determining a third correlation relating to how often a combination of the first element and the second element is a third accident causal factor;
        ranking the plurality of elements and combinations of elements, wherein in the event that the third correlation is greater than the first correlation and the third correlation is greater than the second correlation, the combination of the first element and the second element is ranked higher than the first element alone and the combination of the first element and the second element is ranked higher than the second element alone; and
        determining the one or more factors that contributed to the cause of the vehicle accident based on the ranked plurality of elements and the ranked combinations of elements;
    evaluating a group of events relating to a driver or a group of drivers based on an analysis of the driving event data;
    creating a coaching session for the driver or the group of drivers based on the group of events;
    providing the coaching session to the driver or the group of drivers to avoid the one or more factors that contribute to causes of vehicle accidents;
    generating an interactive multimedia report of the vehicle accident, wherein the report includes (i) the determined one or more factors that contributed to the cause of the vehicle accident and (ii) a user interface to step through a reconstruction of at least one stage of the vehicle accident, wherein the step through includes at least the video data corresponding to a respective stage of the vehicle accident;
    outputting the report; and
    updating the historical information in the database, wherein the historical information is updated with the one or more elements, correlations, and the one or more factors, wherein updating the historical information in the database allows later forensic analyses to benefit from aggregated historical information.

2. A system to generate a report of a vehicle accident, comprising:
    an event detector in communication with an event capture device coupled to a vehicle, wherein the event detector comprises a processor configured to:
    capture driving event data, wherein the driving event data is associated with a vehicle accident, wherein the driving event data is selectively captured in response to a trigger by the event detector and comprises at least video data, audio data, metadata fields, and vehicle status information from before, during, and after the vehicle accident;
    upload the driving event data to an evaluation server;
    the evaluation server comprising one or more processors configured to:
        receive driving event data at the evaluation server from the event detector;

identify one or more elements from the driving event data, wherein the one or more elements comprise individual data points from the driving event data, wherein the identifying of the one or more elements comprises:
  perform a computer analysis of one of the video data for indicators that point to vehicle accident elements,
  perform a computer analysis of one of the audio data for indicators that point to vehicle accident elements, comprising to:
    determine whether decibel level on the audio data indicates an accident has occurred, the audio data being recorded inside the vehicle,
  analyze metadata fields of the driving event data for temperature conditions as one of the one or more elements,
  analyze the driving data for vehicle status information as one of the one or more elements, wherein vehicle status information comprises speed and acceleration data before and during the accident, and
  flag elements determined by the computer analysis to be vehicle accident elements;
evaluate a group of events relating to a driver or a group of drivers based on an analysis of the driving event data;
create a coaching session for the driver or the group of drivers based on the group of events;
provide the coaching session to the driver or the group of drivers to avoid the one or more factors that contribute to causes of vehicle accidents;
receive historical information from a database, wherein the historical information comprises prior captured driving event data elements, and a plurality of correlations that describe how often a particular element of the prior captured driving event data elements is an accident causal factor;
correlate the one or more elements to the prior captured driving event data elements and the plurality of correlations;
determine one or more factors that contributed to a cause of the vehicle accident, comprising:
  determine a first correlation relating to how often a first element of the prior captured driving event data elements is an accident causal factor;
  determine a second correlation relating to how often a second element of the prior captured driving event data elements is an accident causal factor;
  determine a third correlation relating to how often a combination of the first element and the second element is an accident causal factor;
  rank the plurality of elements and combinations of elements, wherein in the event that the third correlation is greater than the first correlation and the third correlation is greater than the second correlation, the combination of the first element and the second element is ranked higher than the first element alone and the combination of the first element and the second element is ranked higher than the second element alone; and
  determine the one or more factors that contributed to the cause of the vehicle accident based on the ranked plurality of elements and the ranked combinations of elements;
generate an interactive multimedia report of the vehicle accident, wherein the report includes (i) the determined one or more factors that contributed to the cause of the vehicle accident and (ii) a user interface to step through a reconstruction of at least one stage of the vehicle accident, wherein the step through includes outputting at least the video data corresponding to a respective stage of the vehicle accident;
output the report; and
update the historical information in the database, wherein the historical information is updated with the one or more elements, correlations, and the one or more factors, wherein updating the historical information in the database allows later forensic analyses to benefit from aggregated historical information.

3. The system of claim 2, wherein the one or more processors is/are further configured to provide the driving event data to an operator for identification of any other elements for correlation.

4. The system of claim 2, wherein the one or more processors of the evaluation server are further configured to determine one or more elements from information comprising one or more of the following: traffic information, weather information, road conditions, smog information, or visibility information.

5. The system of claim 2, wherein the report further includes at least one of: the audio data, and the vehicle status information.

6. The system of claim 2, wherein the historical information comprises historical information associated with another vehicle.

7. The system of claim 2, wherein the driving event data comprises location or GPS information.

8. The system of claim 2, wherein the driving event data further comprises one or more of the following: a still images or video from inside of the vehicle, still images or video from outside of the vehicle, or still images or video from 360 degree area surrounding the vehicle.

9. The system as in claim 2, wherein the driving event data comprises one or more of the following: force data, acceleration data, or direction of the vehicle data.

10. The system as in claim 2, wherein the driving event data further comprises one or more of the following: temperature data, moisture data, on-board diagnostic vehicle bus information, vehicle engine information, vehicle electrical component information, status information of vehicle lights and signals, brake operation and position information, throttle position information, number of occupants in the vehicle information, seatbelts fastened or not information, airbags deployed or not information, or vehicle driver identification information.

11. The system of claim 2, wherein performing the computer analysis of the one or more video data comprises analyzing the video data from the event capture device coupled to the vehicle for significant and rapid color changes from frame to frame over large portions of the frame which indicates a rapid change in direction of the vehicle.

12. A computer program product to generate a report of a vehicle accident, the computer program product being embodied in a non-transitory computer readable storage medium and comprising computer instructions for:
  capturing driving event data using an event detector in communication with an event capture device coupled to a vehicle, wherein the driving event data is associated with a vehicle accident, wherein the driving event data is selectively captured by the event detector in response to a trigger and comprises at least video data, audio data, metadata fields, and vehicle status information from before, during and after the vehicle accident;

uploading the driving event data to an evaluation server;

receiving driving event data at the evaluation server from the event detector;

identifying one or more elements from the driving event data, wherein the one or more elements comprise individual data points from the driving event data, wherein identifying the one or more elements comprises:
- performing a computer analysis of one of the video data for indicators that point to vehicle accident elements,
- performing a computer analysis of one of the audio data for indicators that point to vehicle accident elements, comprising:
  - determining whether decibel level on the audio data indicates an accident has occurred, the audio data being recorded inside the vehicle,
- analyzing metadata fields of the driving event data for temperature conditions as one of the one or more elements,
- analyzing the driving data for vehicle status information as one of the one or more elements, wherein vehicle status information comprises speed and acceleration data before and during the accident, and
- flagging elements determined by the computer analysis to be vehicle accident elements;

evaluating a group of events relating to a driver or a group of drivers based on an analysis of the driving event data;

creating a coaching session for the driver or the group of drivers based on the group of events;

providing the coaching session to the driver or the group of drivers to avoid the one or more factors that contribute to causes of vehicle accidents;

receiving historical information from a database, wherein the historical information comprises prior captured driving event data elements, and a plurality of correlations that describe how often a particular element of the prior captured driving event data elements is an accident causal factor;

correlating the one or more elements to the prior captured driving event data elements and the plurality of correlations;

determining one or more factors that contributed to a cause of the vehicle accident, comprising:
- determining a first correlation relating to how often a first element of the prior captured driving event data elements is a first accident causal factor;
- determining a second correlation relating to how often a second element of the prior captured driving event data elements is a second accident causal factor;
- determining a third correlation relating to how often a combination of the first element and the second element is a third accident causal factor;
- ranking the plurality of elements and combinations of elements, wherein in the event that the third correlation is greater than the first correlation and the third correlation is greater than the second correlation, the combination of the first element and the second element is ranked higher than the first element alone and the combination of the first element and the second element is ranked higher than the second element alone; and
- determining the one or more factors that contributed to the cause of the vehicle accident based on the ranking of the plurality of elements and the combinations of elements;

generating an interactive multimedia report of the vehicle accident, wherein the report includes (i) the determined one or more factors that contributed to the cause of the vehicle accident and (ii) a user interface to step through a reconstruction of at least one stage of the vehicle accident, wherein the step through includes outputting at least the video data corresponding to a respective stage of the vehicle accident;

outputting the report; and updating the historical information in the database, wherein the historical information is updated with the one or more elements, correlations, and the one or more factors, wherein updating the historical information in the database allows later forensic analyses to benefit from aggregated historical information.

* * * * *

UNITED STATES PATENT AND TRADEMARK OFFICE
CERTIFICATE OF CORRECTION

PATENT NO.        : 9,836,716 B2
APPLICATION NO.   : 11/382325
DATED             : December 5, 2017
INVENTOR(S)       : Gunderson et al.

It is certified that error appears in the above-identified patent and that said Letters Patent is hereby corrected as shown below:

On the Title Page

Page 5, Column 2, Item (56), References Cited, Other Publications, delete "Lin et al. EEG-Based Drowsiness Estimation for Safety Driving Using Independent Component Analysis; Circuits and Systems I: Regular Papers, IEEE Transactions on, vol. 52, Issue 12, Dec. 2005, pp. 2726-2738; Digital Identifier 10.1109/TCSI.2005.857555.", insert --Lin et al. EEG-Based Drowsiness Estimation for Safety Driving Using Independent Component Analysis; Circuits and Systems I: Regular Papers, IEEE Transactions on, vol. 52, Issue 12, Dec. 2005, pp. 2726-2738; Digital Object Identifier 10.1109/TCSI.2005.857555.--, therefor.

Signed and Sealed this
Twelfth Day of June, 2018

Andrei Iancu
*Director of the United States Patent and Trademark Office*